United States Patent
Almond et al.

(10) Patent No.: US 7,750,079 B2
(45) Date of Patent: Jul. 6, 2010

(54) COMPOSITIONS AND METHODS FOR PRODUCING SILICONE HYDROGEL CONTACT LENSES

(75) Inventors: Sarah L. Almond, Southampton (GB); John H. D. Browning, Alresford (GB)

(73) Assignee: CooperVision International Holding Company, LP, St. Michael (BB)

( * ) Notice: Subject to any disclaimer, the term of this patent is extended or adjusted under 35 U.S.C. 154(b) by 931 days.

(21) Appl. No.: 11/499,935

(22) Filed: Aug. 7, 2006

(65) Prior Publication Data

US 2007/0037944 A1 Feb. 15, 2007

Related U.S. Application Data

(60) Provisional application No. 60/707,029, filed on Aug. 9, 2005.

(51) Int. Cl.
*C08F 2/50* (2006.01)
*C08J 7/18* (2006.01)
*C08G 18/67* (2006.01)

(52) U.S. Cl. ............ 525/101; 522/64; 522/82; 522/172; 522/174; 522/182; 524/157; 524/547; 526/220; 526/225; 526/264; 526/279; 526/303.1; 526/319; 526/320; 526/323.1

(58) Field of Classification Search ............ 522/64, 522/82, 172, 174, 182; 524/157, 547; 525/101; 526/220, 225, 264, 279, 303.1, 319, 320, 526/323.1, 328.5
See application file for complete search history.

(56) References Cited

U.S. PATENT DOCUMENTS

| | | | |
|---|---|---|---|
| 5,292,350 | A | 3/1994 | Molock et al. |
| 5,358,995 | A | 10/1994 | Lai et al. |
| 5,945,498 | A | 8/1999 | Höpken et al. |
| 6,364,934 | B1 | 4/2002 | Nandu et al. |
| 6,551,531 | B1 | 4/2003 | Ford et al. |
| 6,867,245 | B2 | 3/2005 | Iwata et al. |
| 7,429,623 | B2 * | 9/2008 | Molock et al. ............ 522/64 |
| 2002/0107324 | A1 | 8/2002 | Vanderlaan et al. |
| 2002/0137811 | A1 | 9/2002 | Turek et al. |
| 2003/0000028 | A1 | 1/2003 | Molock et al. |
| 2003/0125498 | A1 | 7/2003 | McCabe et al. |
| 2004/0000732 | A1 | 1/2004 | Spaulding et al. |
| 2006/0134169 | A1 | 6/2006 | Linhardt et al. |

FOREIGN PATENT DOCUMENTS

| | | |
|---|---|---|
| EP | 0908476 | 4/1999 |
| WO | WO 01/70824 | 9/2001 |
| WO | WO 2006/026474 | 3/2006 |

OTHER PUBLICATIONS

U.S. Appl. No. 11/200,848, filed Aug. 9, 2005.
U.S. Appl. No. 11/200,648, filed Aug. 9, 2005.
U.S. Appl. No. 11/200,644, filed Aug. 9, 2005.
U.S. Appl. No. 11/201,410, filed Aug. 9, 2005.
U.S. Appl. No. 11/200,863, filed Aug. 9, 2005.
U.S. Appl. No. 11/200,862, filed Aug. 9, 2005.
U.S. Appl. No. 11/201,409, filed Aug. 9, 2005.
International Search Report dated Sep. 3, 2008, in related PCT application No. PCT/US06/30424.
European Search Report dated Jun. 5, 2009, in related European application No. EP06016473.

* cited by examiner

*Primary Examiner*—Helen L. Pezzuto
(74) *Attorney, Agent, or Firm*—Stout, UXA, Buyan & Mullins; Frank J. UXA

(57) ABSTRACT

Compositions, such as lens precursor compositions, and methods for producing lens precursor compositions have been invented. The present methods include forming a premix composition, which can include one or more monomeric components, forming a macromer composition, which includes one or more silicon containing macromers, forming a premix/initiator composition, which can include a photoinitiator, and contacting the premix/initiator composition with the macromer composition to form a polymerizable monomer-containing composition useful in the production of producing silicone hydrogel contact lenses.

14 Claims, No Drawings

COMPOSITIONS AND METHODS FOR PRODUCING SILICONE HYDROGEL CONTACT LENSES

CROSS-REFERENCE TO RELATED APPLICATION

This application claims the benefit of U.S. application Ser. No. 60/707,029, filed Aug., 9, 2005, the entire contents of which are hereby incorporated by reference.

The present invention relates to silicone hydrogel contact lenses and the production thereof. More particularly, the present invention relates to compositions, such as lens precursor compositions, and methods for producing such compositions.

BACKGROUND

In the production of contact lenses, a polymerizable lens precursor composition can be placed on a contact lens shaped cavity of a mold assembly and can be polymerized therein to form a contact lens located in the lens shaped cavity of the mold assembly. For example, a polymerizable lens precursor composition can be exposed to ultraviolet light or heat to polymerize the composition.

After polymerizing the lens precursor composition, the mold sections are separated or demolded and the polymerized contact lens can be removed or delensed from the mold section.

Existing polymerized silicone hydrogel contact lenses are associated with ophthalmically unacceptable surface wettabilities. To make silicone hydrogel contact lenses have ophthalmically acceptable surface wettabilities, surface treatments are provided on the lenses or an interpenetrating polymeric network (IPN) of a polymeric wetting agent is included in the contact lens. Surface treatments and polymeric wetting agent IPNs can degrade over time and result in less wettable silicone hydrogel contact lenses.

There remains a need for lens precursor compositions for producing silicone hydrogel contact lenses that have one or more desirable properties, such as high oxygen permeability, water content, modulus, surface wettabilities, and the like. There also remains a need for silicone hydrogel contact lens precursor compositions that produce silicone hydrogel contact lenses that are durable during the manufacturing process to reduce incidence of damage to the contact lenses during the manufacturing process.

SUMMARY

Compositions, such as polymerizable lens precursor compositions, and methods for producing lens precursor compositions have been invented. As described in more detail herein, the present methods comprise forming a premix composition, which can comprise one or more monomeric components, forming a macromer composition, which comprises one or more silicon containing macromers, forming a premix/initiator composition, which can comprise a photoinitiator or thermal initiator, and contacting the premix/initiator composition with the macromer composition to form a polymerizable monomer-containing composition useful in the production of silicone hydrogel contact lenses.

The present compositions are effective in forming silicone hydrogel contact lenses having ophthalmically acceptable surface wettabilities without requiring a surface treatment to provide the surface wettability and/or an interpenetrating polymeric network (IPN) of a polymeric wetting agent to provide an ophthalmically acceptable surface wettability. Silicone hydrogel contact lenses obtained from the present compositions are durable and are relatively easy to work with during the manufacture of the contact lenses, such as during cast molding procedures for producing contact lenses.

Each and every feature described herein, and each and every combination of two or more of such features, is included within the scope of the present invention provided that the features included in such a combination are not mutually inconsistent. In addition, any feature or combination of features may be specifically excluded from any embodiment of the present invention.

These and other aspects of the present invention are apparent in the following detailed description, examples, and additional disclosure.

DETAILED DESCRIPTION

Compositions, such as silicone hydrogel contact lens precursor compositions, and methods of making such compositions have been invented. As used herein, a silicone hydrogel contact lens is a contact lens comprising a hydrophilic silicon-containing polymeric component that has a high oxygen permeability and an ophthalmically acceptable water content. Silicone hydrogel contact lenses can be understood to be contact lenses that comprise a silicone hydrogel material. For example, silicone hydrogel contact lenses can comprise one or more hydrophilic silicon-containing macromers. Examples of suitable materials used to make silicone hydrogel contact lenses include, without limitation, lotrafilcon A, lotrafilcon B, balafilcon A, senofilcon A, galfilcon A, or comfilcon A. Additional examples of materials used to make the present silicone hydrogel contact lenses include those materials disclosed in U.S. Pat. No. 6,867,245.

The present methods comprise steps of producing a plurality of separate compositions that can be combined to form the present lens precursor compositions. The present polymerizable lens precursor compositions are placed in contact lens molds and are polymerized to produce silicone hydrogel contact lenses that have high oxygen permeabilities, desirable water content, desirable moduli, desirable surface wettabilities, and/or desirable ionofluxes. Silicone hydrogel contact lenses produced from the present compositions can be worn for extended periods of time, such as for at least twenty-four hours, for example for about five days or more, including for about two weeks or more, or even for about thirty days.

A method of producing the present compositions comprises a step of forming a premix composition which comprises a plurality of monomers and other components. In one embodiment, the method comprises mixing a salt, a crosslinking agent, a first hydrophilic monomer, a hydrophobic monomer, a second hydrophilic monomer different than the first hydrophilic monomer, and a third hydrophilic monomer different than either the first hydrophilic monomer or the second hydrophilic monomer to form the premix composition.

The method can comprise a step of measuring predetermined amounts of the salt, the crosslinking agent, the hydrophilic monomers, and the hydrophobic monomer prior to mixing.

A mixing vessel can be placed on a stirrer for mixing the measured components. The components used to form the liquid premix composition are added to the vessel, and are stirred at a relatively slow speed, such as from about 100 to about 500 rotations per minute (rpm), until the mixture becomes a homogenous composition. Care is taken to prevent bubble formation on an exposed surface of the composition and to prevent the liquid surface from breaking. The exposed surface is the surface of the liquid composition at the air/liquid interface.

In certain embodiments disclosed herein, the stirring of the various compositions can be accomplished using a magnetic stir bar and a magnetic stir plate. In other embodiments, the stirring is practiced using a stirring shaft instead of the stir bar.

After completely mixing the premix composition, determined visually or with one or more instruments, the premix composition can be processed for quality control, such as by weighing the amount of the composition in the mixing vessel, and/or analyzing a portion of the premix composition using a range of analytical instruments such as, but not limited to, a gas chromatograph.

The premix composition can be used immediately after completely mixing the components, or it can be stored for a period of time from about two weeks to about four weeks or more from the date of manufacture without a substantial loss of properties.

The components used in the production of the premix composition can vary depending on the particular properties desired for the resulting silicone hydrogel contact lenses. Such components can be tested using routine methods such as forming a sample batch of silicone hydrogels using compositions containing the components, and measuring properties of the silicone hydrogel contact lenses, such as Dk, modulus, water content, tear strength, ionoflux, surface wettability, and the like.

In certain embodiments, the premix composition comprises at least one component, or one or more components, selected from the group consisting of sodium salts, cyanurates, vinyl pyrrolidones, hydrophobic methacrylates, hydrophilic methacrylates, and methylacetamides. In certain embodiments, the premix composition comprises each of the foregoing components. For example, the premix composition comprises a combination which includes each of these components. In one embodiment, the premix composition comprises the following components: sodium dioctyl sulfosuccinate, triallyl isocyanurate, N-vinyl-2-pyrrolidone, isobornyl methacrylate, 2-hydroxybutyl methacrylate, and N-vinyl-N-methylacetamide.

In an additional embodiment, a premix composition comprises less than 1% sodium dioctyl sulfosuccinate, less than 1% triallyl isocyanurate, about 53% N-vinyl-2-pyrrolidone, about 11% isobornyl methacrylate, about 18% 2-hydroxybutyl methacrylate, and about 18% N-vinyl-N-methylacetamide. Each of these percentages can be understood to be wt/wt percentages.

The present methods can also comprise a step of forming a macromer composition. The macromer composition formed with the present methods comprises one or more silicon containing macromers. In certain embodiments, the macromer composition comprises two different silicon-containing macromers. In one embodiment of the present methods, the method comprises mixing a first silicon containing macromer and a different second silicon containing macromer to form the macromer composition.

The method can comprise a step of measuring predetermined amounts of the first and second silicon containing macromers and placing the macromers in a mixing vessel.

The mixing vessel can be placed on a stirrer for mixing the macromers. The macromer composition is stirred at a relatively slow speed, such as from about 100 to about 500 rotations per minute (rpm), until the mixture becomes a homogenous composition. Care is taken to prevent bubble formation on an exposed surface or in the body of the composition and to prevent the surface from breaking, as discussed for the premix composition.

The silicon containing macromers can vary depending on the particular properties desired for the resulting silicone hydrogel contact lenses. Such macromers can be tested using routine methods such as forming a sample batch of silicone hydrogels using compositions containing the macromers, and measuring properties of the silicone hydrogel contact lenses, such as Dk, modulus, water content, tear strength, ionoflux, surface wettability, and the like.

In certain embodiments, the first silicon containing macromer is a polymethylsiloxane methacrylate derivative having a molecular weight of about 1,200 and which imparts a high oxygen permeability to a silicone hydrogel contact lens produced therefrom. In certain embodiments, the second silicon containing macromer is a polysiloxanyl dimethacrylate having a molecular weight of about 15,000, and which imparts a high oxygen permeability to a silicone hydrogel contact lens produced therefrom.

In further embodiments, the first macromer can be represented by the following formula:

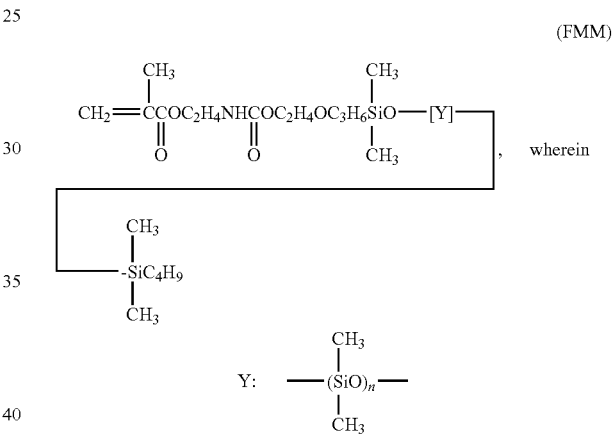

(FMM), wherein

This material, identified as FMM (CAS # 697234-76-7), has a number average molecular weight of about 1400 or about 1200.

In still further embodiments, the second macromer can be represented by the following formula:

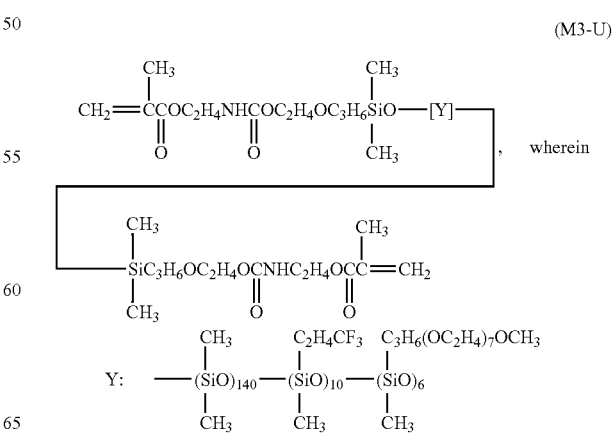

(M3-U), wherein

This material, identified as M3U (CAS # 697234-74-5), has a number average molecular weight of about 15,000.

In yet additional embodiments, the macromer composition comprises the combination of FMM and M3U described above. In other embodiments, the macromer composition comprises M3U as the only silicon-containing macromer.

The present methods may also comprise a step of forming a premix/initiator composition. For example, a method may comprise a step of contacting the premix composition with an initiator to form the premix/initiator composition. For example, a method may comprise adding a predetermined amount of the premix composition to a mixing vessel, adding an initiator to the premix composition in the mixing vessel, and stirring the premix/initiator composition so formed. The stirring is performed to form a homogenous composition without breaking the surface of the liquid composition or forming bubbles within the body or on the surface of the liquid composition, as described herein.

A variety of initiators can be used to form the premix/initiator composition. In certain embodiments, the initiator comprises an ultraviolet photoinitiator. In more specific embodiments, the initiator is diphenyl (2,4,6-trimethylbenzoyl) phosphine oxide. Other suitable photoinitiators or thermal initiators can be identified and used in the present compositions by routine methods, as discussed herein.

The present methods may also comprise a step of forming a polymerizable monomer-containing composition. For example, a method may comprise contacting the premix/initiator composition with the macromer composition described herein to form a polymerizable monomer-containing composition. In certain embodiments, the method may comprise adding a predetermined amount of the premix/initiator composition to the macromer composition. After adding the two compositions together, the method may comprise stirring the resulting polymerizable monomer-containing composition without disrupting or breaking the exposed surface of the composition or introducing bubbles within the body or on the surface of the liquid composition, as described herein.

In certain embodiments, the polymerizable monomer-containing compositions, which comprises FMM and M3U, can comprise about 9% wt/wt % of FMM, about 40% wt/wt of M3U, about 51% wt/wt of the pre-mix composition, and less than 1% wt/wt of the initiator. If the composition includes a tinting agent, the tinting agent is also present in an amount less than 1% wt/wt, such as about 0.1% wt/wt.

Since the present compositions may comprise an ultraviolet photoinitiator, which initiates polymerization of the components of the compositions when exposed to ultraviolet light, the amount of ultraviolet light within the preparation area must be controlled. For example, it would be beneficial to exclude light having a wavelength shorter than 500 nm from the immediate vicinity in which the compositions are prepared. Reducing or preventing exposure to the ultraviolet light can be achieved by at least one of the following steps: mixing the compositions and composition components in amber vessels, or vessels having a ultraviolet blocking coating or shield, situating the devices used in the methods at least two meters from any windows, using yellow light bulbs or light bulbs that do not emit UV light below 500 nm, using coverings of one or more of the devices that block light having a wavelength shorter than 500 nm, and ensuring that any non-specialized light sources in the working area are switched off.

The present methods may also comprise one or more filtering or separation steps. For example, the present methods may comprise a step of filtering the polymerizable monomer-containing composition. In one embodiment, the method comprises using a polypropylene, glass-polypropylene, nylon or similar filter having a pore size between 1 μm and 20 μm to filter the polymerizable monomer-containing composition into another vessel to form a filtered polymerizable monomer-containing composition. This filtering may be effective in filtering out any particulates and/or any discontinuous phase which may be present in the composition. The resulting filtered composition can be understood to be a composition that is substantially free of particulates and/or discontinuous phase.

The present methods may also comprise adding a tinting agent to the polymerizable monomer-containing composition. The tinting agent can be added to the pre-filtered polymerizable monomer-containing composition or to the filtered polymerizable monomer-containing composition. In one embodiment, the method comprises adding the tinting agent to the filtered polymerizable monomer-containing composition. The method may also comprise stirring the polymerizable monomer-containing composition containing the tinting agent without breaking an exposed surface of the liquid composition or introducing bubbles within the body or on the surface of the liquid composition, as described herein.

Any suitable tinting agent may be used in the present compositions. Tinting agents are selected based on their compatibility with the other components of the present compositions, as well as their ability to permit a silicone hydrogel contact lens formed from the present compositions to be visualized after polymerization of the materials. In certain embodiments, the tinting agent is provided as particles having an average maximum particle size dimension, such as diameter, less than about 3 μm. Other tinting agents can be used that have different maximum sizes, including areas and volumes. Preferably, the tinting agent is sized to pass through a filter device used to filter the compositions.

One example of a useful tinting agent is phthalocyanine blue. In certain embodiments, the phthalocyanine blue is suspended in the M3U composition, described above, to form a tinting agent composition identified as M3U Blue.

After adding the tinting agent to the filtered polymerizable monomer-containing composition, the present methods may comprise filtering the resulting composition into syringes or syringe barrels or bodies for storing and/or dispensing the final composition. In certain embodiments, methods may comprise rinsing the syringes with an organic composition, such as industrial methylated spirits, and drying the syringes before adding the final lens precursor composition to the syringes. The filtering into the syringes may comprise using a polypropylene glass-polypropylene, nylon or similar filter having a pore size between 1μm and 20μm. This filtering may be effective in filtering out any particles and or any discontinuous phase which may be present in the composition. As can be appreciated from above, the filters used in the present methods may have pore sizes that are larger than the maximum size of the tinting agent.

The filtering steps described herein may be practiced by passing a composition prior to adding the tinting agent or after adding the tinting agent through a filter. The filters may have a pore size from about 1 μm to about 20 μm. In certain embodiments, the pore size is about 3 μm. The filter can be provided as a disc filter or as a cartridge filter, or both. In certain embodiments, a composition without a tinting agent is filtered with a first filter, a tinting agent is added to the filtered composition, and the tinting agent-containing composition is filtered with a second filter having a pore size that is greater than the pore size of the first filter.

In view of the above, it can be understood that the present methods may comprise a step of directing a filtered, tinted polymerizable monomer-containing composition into a body of a syringe. Since the polymerizable monomer-containing composition is light sensitive, it is desirable to use syringes made from a material which includes an ultraviolet blocker or filter to prevent premature polymerization of the composition in the syringe body.

Samples of the compositions can be obtained from the syringes, and the samples can be processed for quality control using gas chromatography and other analytical techniques, such as a spectrophotometer.

The present methods may also comprise a step of degassing the filtered, tinted, polymerizable monomer-containing composition. In certain embodiments, the degassing is performed using a vacuum oven and nitrogen. Other conventional methods of degassing can be performed without departing from the spirit of the invention.

The present methods may also comprise closing the syringe body for storage. For example, a method may comprise placing a piston in the syringe body, such as a syringe plunger, and placing a cap on an end of the syringe body.

Syringes containing the filtered, tinted, polymerizable monomer-containing composition can be placed onto a rack for storage. The rack containing the syringes can be used to facilitate and enhance the dispensing of the lens precursor composition in contact lens molds used to produce silicone hydrogel contact lenses.

The present methods may also comprise a step of storing the filtered, tinted polymerizable monomer-containing composition at a temperature less than room temperature (e.g., at a temperature less than 20-25° C.). In certain embodiments, the composition is stored at a temperature between about 0° C. and about 5° C. For example, the composition, or racks containing composition filled syringes, can be stored in a refrigerator or other cooling apparatus.

The storing of the final composition can occur for a time period of about five days. For example, at a reduced temperature, such as from about 0° C. to about 5° C., the composition can be stored for about 5 days up to at least four weeks without losing the chemical and other properties of the composition. At room temperature, the composition can be stored for at least two days.

The lenses produced using the present systems and methods can be understood to be extended wear contact lenses. For example, the lenses can be worn by a person continuously for more than one day (e.g., 24 hours) without undue discomfort or damage to the eye. Certain lenses can be worn for at least five days, for example for about one or two weeks, or for about thirty days or more.

The present methods may be manually performed or automated. In certain embodiments, each of the steps is automated. For example, the loading of the syringes with the compositions can be performed manually or with an automated device.

In addition, the present methods may include one or more steps of coding the syringes and/or syringe racks structured to hold the syringes. In certain embodiments, the syringes and syringe racks are color coded. For example, a method may include placing one or more colored stickers on the syringes and the syringe racks so that the syringes and/or racks can be properly identified. In certain embodiments, the syringes and the syringe racks have the same color coding. Other coding devices can be provided instead of the color codes or in addition to the color codes. For example, the syringes or syringe racks may include a numbering scheme, machine readable bar codes or other devices, and the like.

In view of the disclosure herein, another aspect of the present invention relates to lens precursor compositions.

In one embodiment, a polymerizable lens precursor composition comprises at least one of, and preferably all of, a salt, a crosslinking agent, a first hydrophilic monomer, a hydrophobic monomer, a second hydrophilic monomer different than the first hydrophilic monomer, and a third hydrophilic monomer different than either the first hydrophilic monomer or the second hydrophilic monomer, a first silicon containing macromer, a different second silicon containing macromer, and an initiator.

The composition may be a filtered composition, as discussed herein. The composition may be provided in a syringe body which is made from a material which includes an ultraviolet light blocker. In addition, or alternatively, the present compositions may comprise a tinting agent.

In view of the disclosure herein, in one embodiment, a lens precursor composition comprises sodium dioctyl sulfosuccinate, triallyl isocyanurate, N-vinyl-2-pyrrolidone, isobornyl methacrylate, 2-hydroxybutyl methacrylate, N-vinyl-N-methylacetamide, polymethylsiloxane methacrylate derivative having a molecular weight of about 1,200 and which imparts a high oxygen permeability to a silicone hydrogel contact lens produced therefrom, a polysiloxanyl dimethacrylate having a molecular weight of about 15,000, and which imparts a high oxygen permeability to a silicone hydrogel contact lens produced therefrom, and diphenyl (2,4,6-trimethylbenzoyl) phosphine oxide.

In a further embodiment, the present polymerizable compositions are free or substantially free of oligomers or polymers derived from vinylpyrrolidone. Without polymers of vinylpyrrolidone, the present silicone hydrogel contact lenses of this embodiment do not include an IPN of a polymeric wetting agent.

As discussed herein, the present lens precursor compositions can be placed in a contact lens cavity of a mold assembly and be exposed to a polymerization source, such as ultraviolet light or heat, to form a silicone hydrogel contact lens. When exposed to heat, a thermal initiator is provided in the present precursor compositions instead of a photoinitiator. For example, the composition can be placed on a concave surface of a contact lens mold section using any conventional technique or device. In certain embodiments, the composition is placed on the concave surface using an automated dispensing apparatus which includes one of the pre-filled syringes disclosed herein. The dispense of the composition can be controlled using a pressurized gas delivered via a pumping device and a conduit. Thus, discrete and reproducible amounts of the composition can be dispensed onto the concave surface. It can be understood that the present silicone hydrogel contact lenses are cast molded contact lenses, and the additional steps of cast molding methods are known to persons of ordinary skill in the art.

Certain aspects and advantages of the present invention may be more clearly understood and/or appreciated with reference to the following commonly owned United States Patent Applications, filed on even date herewith, the disclosure of each of which is incorporated herein in its entirety by reference: U.S. patent application Ser. No. 11/200,848, entitled "Contact Lens Molds and Systems and Methods for Producing Same"; U.S. patent application Ser. No. 11/200,648, entitled "Contact Lens Mold Assemblies and Systems and Methods of Producing Same"; U.S. patent application Ser. No. 11/200,644, entitled "Systems and Methods for Producing Contact Lenses from a Polymerizable Composition"; U.S. patent application Ser. No. 11/201,410, entitled "Systems and Methods for Removing Lenses from Lens Molds";

U.S. patent application Ser. No. 11/200,863, entitled "Contact Lens Extraction/Hydration Systems and Methods of Reprocessing Fluids Used Therein"; U.S. patent application Ser. No. 11/200,862, entitled "Contact Lens Package"; and U.S. patent application Ser. No. 11/201,409, entitled "Systems And Methods For Producing Silicone Hydrogel Contact Lenses". Additional information is present in PCT Publication No. WO2006026474.

A number of publications and patents have been cited hereinabove. Each of the cited publications and patents are hereby incorporated by reference in their entireties.

While this invention has been described with respect to various specific examples and embodiments, it is to be understood that the invention is not limited thereto and that it can be variously practiced within the scope of the following additional disclosure.

What is claimed is:

1. A method for producing a silicone hydrogel contact lens precursor composition, comprising:

mixing a salt, a crosslinking agent, a first hydrophilic monomer, a hydrophobic monomer, a second hydrophilic monomer different than the first hydrophilic monomer, and a third hydrophilic monomer different than either the first hydrophilic monomer or the second hydrophilic monomer, to form a premix composition;

mixing a first silicon containing macromer and a different second silicon containing macromer to form a macromer composition;

contacting the premix composition with an initiator to form a premix/initiator composition; and contacting the premix/initiator composition with the macromer composition to form a polymerizable monomer-containing composition, wherein the salt is sodium dioctyl sulfosuccinate, the crosslinking agent is triallyl isocyanurate, the first hydrophilic monomer is N-vinyl-2-pyrrolidone, the hydrophobic monomer is isobornyl methacrylate, the second hydrophilic monomer is 2-hydroxybutyl methacrylate, the third hydrophilic monomer is N-vinyl-N-methylacetamide, the first silicon containing macromer is a polymethylsiloxane methacrylate derivative having a molecular weight of about 1,200, the second silicon containing macromer is a polysiloxanyl dimethacrylate having a molecular weight of about 15,000, and the initiator comprises an ultraviolet photoinitiator.

2. The method of claim 1, wherein the initiator is diphenyl (2,4,6-trimethylbenzoyl) phosphine oxide.

3. The method of claim 1, further comprising stirring the polymerizable monomer-containing composition without at least one of (i) disrupting or breaking an exposed surface of the composition and (ii) introducing bubbles into the body of the composition.

4. The method of claim 3, further comprising adding a tinting agent to the polymerizable monomer-containing composition.

5. The method of claim 4, wherein the tinting agent comprises particles have an average maximum particle dimension of less than 3 μm.

6. The method of claim 4, further comprising filtering the polymerizable monomer-containing composition to filter out particles or discontinuous phase which may be present in the composition.

7. The method of claim 6, wherein the filtering comprises using a filter having pores larger than a maximum size of the tinting agent and being selected from the group consisting of polypropylene filters, glass-polypropylene filters, nylon filters, and combinations thereof.

8. The method of claim 6, further comprising directing the filtered polymerizable monomer-containing composition into a body of a syringe, the body being made from a material which includes an ultraviolet blocker or filter to reduce exposure of the filtered polymerizable monomer-containing composition to ultraviolet radiation.

9. The method of claim 8, further comprising a step of degassing the polymerizable monomer-containing composition in the syringe body using a vacuum oven and nitrogen.

10. The method of claim 8, further comprising placing a piston in the syringe body and placing a cap on an end of the syringe body.

11. The method of claim 10, further comprising placing the syringe containing the polymerizable monomer-containing composition onto a rack for storage.

12. The method of claim 11, further comprising storing the polymerizable monomer-containing composition in the syringe at a temperature less than room temperature.

13. The method of claim 12, wherein the storing is for a period of time selected from the group consisting of about five days at a temperature less than room temperature, and about two days at room temperature.

14. The method of claim 1, further comprising storing the premix composition for about two weeks without losing chemical properties of the components of the premix composition.

* * * * *